3,623,886
AMINO ACID-ENRICHED GRAINS AND PROCESS
OF PREPARATION
Hisateru Mitsuda, Kyoto, Japan, assignor to Kyowa
Hakko Kogyo Co., Ltd., Tokyo, Japan
Filed May 19, 1969, Ser. No. 825,503
Claims priority, application Japan, May 20, 1968,
43/33,885, 43/33,886, 43/33,887; Aug. 24,
1968, 43/60,799
Int. Cl. A23l 1/10
U.S. Cl. 99—83                                                     15 Claims

ABSTRACT OF THE DISCLOSURE

Amino acid-enriched grains resistant to the loss of amino acid by washing are produced by treating the grain (such as polished rice) with an aqueous or acidic solution of amino acid, soaking or spraying the amino acid-enriched grain with dibenzoylthiamine, cetyl-$B_1$ or thiamine naphthalene-2,6-disulfonic acid, steaming so as to gelatinize the surface layer of the grain and then drying. Preferred enriching amino acids are lysine and threonine.

---

Figure 1:
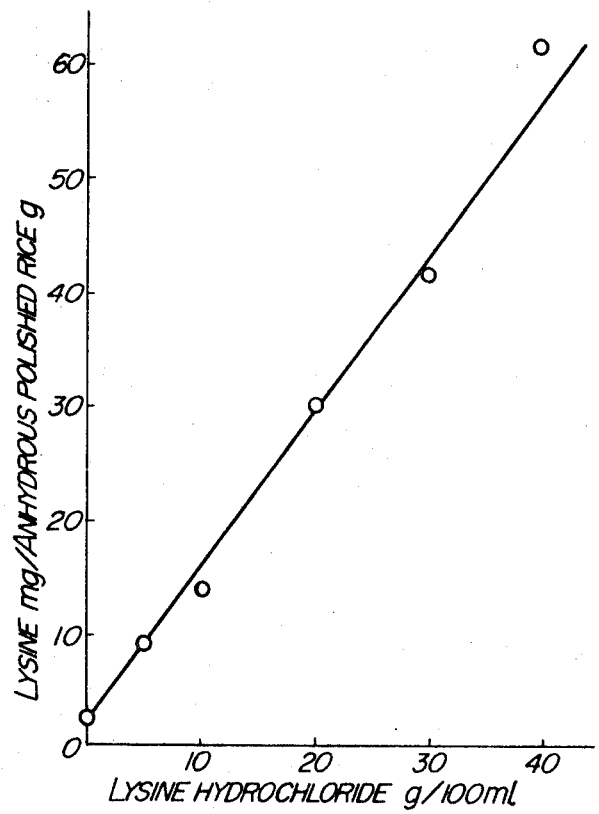

This invention relates to a process for producing enriched grains. More particularly, it relates to a procedure for preventing the loss of amino acid from enriched grains. Even more particularly, the invention relates to a procedure wherein grains are enriched with amino acids and, then, the enriched grains are treated so as to gelatinize the surface layer thereof so as to prevent the loss of the amino acids by washing.

Various procedures have been proposed in the prior art for increasing the nutritional value of grains. Nutrients employed in these enrichment procedures include those of the vitamin B group, amino acids and inorganic substances. However, enrichment with vitamin B has been the only procedure which has been employed in practice, and an enrichment with amino acids has not as yet been perfected. This is because amino acids were extremely expensive and, furthermore, the required intake amount thereof cannot be obtained without also enriching the amount of vitamins by 100 fold or more. Moreover, even if the required amount of amino acids is supplied to the grain, such as in polished rice, it has been impossible to prevent the loss of amino acids by washing, a problem which does not occur with vitamins.

The cost of amino acids has dropped sharply in recent years, thereby remedying one of the original disadvantages. However, the prevention of the loss of amino acids by washing is still a problem in the art, and a solution thereto has been strongly desired by the industry.

Accordingly, one of the objects of the present invention is to provide an improved process for obtaining enriched grains which overcomes the disadvantages and deficiencies of the prior art methods.

Another object of the present invention is to provide a process for producing grains enriched with amino acids which may be carried out in an efficacious manner.

A further object of the invention is to provide amino acid-enriched grains which are resistant to the loss of the amino acids, even by washing.

A still further object of the invention is to provide amino acid-enriched grains.

These and other objects of the present invention will become apparent to those skilled in the art from a consideration of the following specification and claims, as well as the attached drawings.

In accordance with the present invention, grains are soaked in an aqueous solution of amino acids or an acidic solution thereof. In this way, the amino acids permeate into the whole grains. Then, the water is removed. Next, the grains are soaked in or sprayed with a solution of dibenzoylthiamine, cetyl-$B_1$ or thiamine naphthalene-2,6-disulfonic acid, so as to make said thiamine substances permeate into the outer layer of the albumins of the grains. The grains are steamed to gelatinize the surface layer of the grains and then dried. Consequently, a gelatinized layer is formed on the surface layer of the grains. As a result of this treatment, the amino acid-enriched grains are resistant to the loss of amino acids, even by washing.

The enrichment of grains with amino acids such as lysine and threonine is nutritionally very important, and the effect thereof is extremely remarkable. For instance, it is well known in general that whole egg protein contains most of the desirable amounts of the essential amino acids as far as the nutrition of the human is concerned. Polished rice protein is significantly deficient in three amino acids, i.e., lysine, threonine and isoleucine, as compared with whole egg protein. However, other amino acids are contained in polished rice in the preferred amounts with respect to human nutrition. Furthermore, when a mixture of lysine and threonine is ingested by a human, a growth in height, an increase in weight and a reinforcement of physical strength have been noted by many researchers. Accordingly, especially in the case of polished rice, it is necessary to employ an enrichment procedure to supply amino acids thereto, particularly lysine and threonine.

The present invention is explained in more detail, utilizing as an example, polished rice as the grain and lysine as the enriching amino acid.

(1) PERMEATION WITH AMINO ACIDS

Polished rice is steeped in an aqueous solution of lysine or an acid solution thereof and kept for a definite time (8–40 hours) and at a definite temperature (23°–50° C.). The lysine permeates into the whole polished rice thereby. The water is then removed.

The preferred amino acids for the enrichment procedure are lysine and threonine. The preferred concentration of amino acid is 10–40% by weight. The amount of amino acid employed is preferably in the ratio of 0.01–0.2% by weight of amino acid to 1 part by weight of polished rice.

(2) TREATMENT WITH THIAMINE COMPOUNDS

(a) Benzoylthiamine

The polished rice obtained from step (1) is soaked in a solution of dibenzoylthiamine for a definite time (3–5 minutes). Water, acids such as acetic acid, hydrochloric acid, lactic acid and gluconic acid, or an organic solvent such as alcohol or acetone can be used to make up the solution. The concentration of this solution is preferably 1–5% by weight. An amount of 0.5–2.0% by weight of dibenzoylthiamine with respect to the amount of polished rice is preferred.

Instead of the above-described soaking step, organic solvent solutions of dibenzoylthiamine may be sprayed onto the rice. Spraying is carried out for approximately 5–10 minutes. With this procedure, the dibenzoylthiamine permeates the outer layer part of the albumins of the polished rice.

(b) Cetyl-$B_1$

Instead of using dibenzoylthiamine, cetyl-$B_1$ can be employed. Cetyl-$B_1$ is thiamine dicetyl sulfate.

$$N=C-NH_2HO_4SH_{33}C_{16}\ CH_2CH_2OH$$
$$\begin{array}{c} CH_3 \\ | \\ C=\!\!=\!\!C \end{array}$$
$$CH_3-C\ \ C-CH_2-N$$
$$\|\ \ \|\qquad\qquad\diagdown$$
$$N-C\qquad\qquad C-\!\!-\!\!-S\cdot H_2O$$
$$SO_4H_{33}C_{16}$$

Molecular formula: $C_{44}H_{86}O_{16}N_4S_3$
Molecular weight: 927.35
M.P.: 89°–91° C.
Solubility: Soluble in alcohol, hot water and hot acetone, insoluble in water A luke-warm aqueous solution, an acid solution or an organic solvent solution of cetyl-$B_1$ can be used. Soaking is preferably conducted for 5–10 minutes. The temperature of the luke-warm water, if used, is preferably 60°–70° C. Acids such as acetic acid, hydrochloric acid, lactic acid or gluconic acid and organic solvents such as acetone or alcohol are used in the soaking step.

The concentration of cetyl-$B_1$ is preferably 1–5% by weight. An amount of 0.5–2% by weight with respect to the amount of polished rice is employed.

(c) Thiamine compounds

Instead of dibenzoylthiamine or cetyl-$B_1$, the polished rice may be soaked in an organic solvent solution of thiamine naphthalene-2,6-disulfonic acid for a definite time (3–5 minutes). Instead of soaking, an organic solvent solution of thiamine naphthalene-2,6-disulfonic acid can be sprayed onto the polished rice and left as is for a definite time (5–10 minutes) so as to make the thiamine naphthalene-2,6-disulfonic acid permeate into the surface layer of the albumin. Acetone or an alcohol such as methanol or ethanol can be used as the organic solvent.

The concentration of thiamine compound to be employed is about 1–5% by weight. It is used in the ratio of 0.5–2.0% by weight with respect to the amount of polished rice.

After any of the above-described treating procedures (a)–(c) have been carried out, the water is drained from the rice.

(3) STEAMING-GELATINIZING PROCEDURES

Polished rice is steamed for a definite time (3–5 minutes), thereby gelatinizing the surface layer of the polished rice. Then, it is dried at a definite temperature (below 80° C.). If an organic solvent or acidic solution has been used in step (2), it is removed by evaporation. As a result, a gelatinized layer is formed on the surface layer of the polished rice.

By means of these procedures, desired amino acids can be permeated into the grains. The permeated amino acid is substantially retained even when washing the rice in boiling water because of the two layers, a hard layer which is soluble in water and a gelatinized surface layer created by the permeation of the dibenzoylthiamine, cetyl-$B_1$ or thiamine compound into the outer layer of the grain albumins. Accordingly, by means of the present invention, it becomes possible to obtain amino acid-enriched grains which are delicious and full of nutrition and which retain their enrichmen even with washing.

In order to observe this result, three samples, i.e., a non-treated polished rice enriched with lysine, a lysine-enriched polished rice which is simply gelatinized in the surface layer thereof (modification to α-starch) and polished rice treated in accordance with the method of the present invention, are steeped in water for 10 minutes. The amounts of lysine lost are 42%, 28%, 14% (dibenzoylthiamine and thiamine compound treatments) and 13% (cetyl-$B_1$), respectively, the last two figures reflecting the results obtained after treatmen in accordance wih the invention. It is evident that the results obtained by means of the present invention are excellent.

Moreover, grains enriched with an amino acid in accordance with the method of the invention are delicious, have no toxicity and present an appearance which is almost similar to the usual polished rice. Furthermore, the enriching amino acid is easily eluted by boiling the rice. Accordingly, when a mixture of amino acid-enriched grains and untreated grains are boiled in the usual way, the amino acid is uniformly distributed throughout the whole of the grains boiled. Therefore, the procedure of the present invention is quite useful for nutritional applications.

Referring to the attached drawings, FIG. 1 shows the concentration of lysine solution and the amounts of lysine permeated into polished rice.

Figure 2:
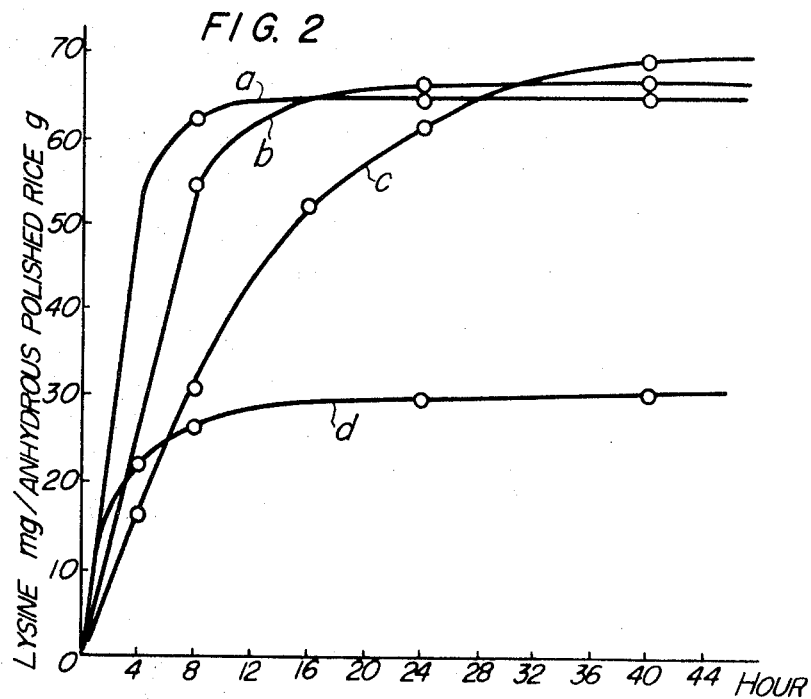

FIG. 2 shows the relationship between the amount of lysine permeated in polished rice and the time of soaking. In FIG. 2, curve $a$ represents a 40% lysine hydrochloride solution at 50° C., curve $b$ a 40% lysine hydrochloride solution at 37° C., curve $c$ a 40% lysine hydrochloride solution at 23° C., and curve $d$ a 20% lysine hydrochloride solution at 23° C.

Figure 3:
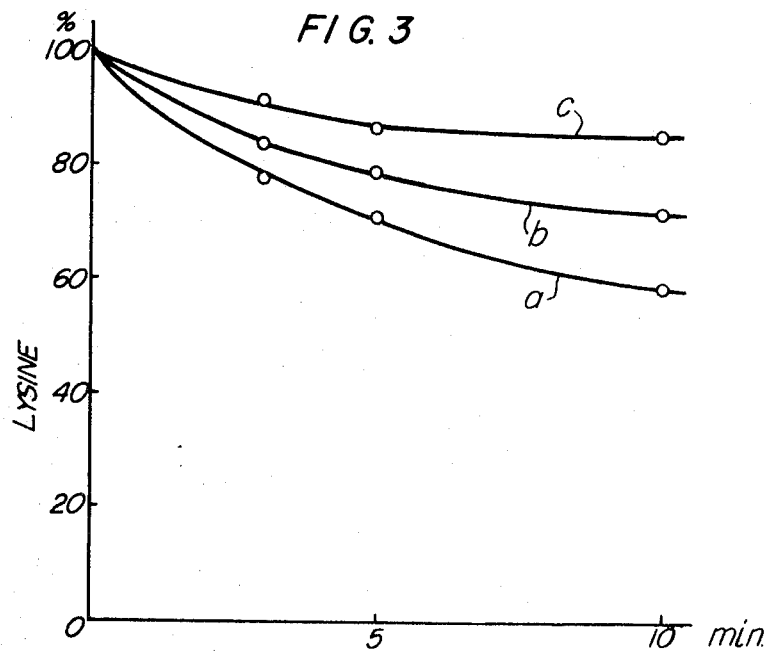

FIG. 3 shows that the loss of lysine by washing a rice enriched with lysine produced according to the method of the present invention is small and that the present method is superior to methods known heretofore. In FIG. 3, curve $a$ represents the loss of lysine in a non-treated product, curve $b$ shows the loss after a modification of the product to α-starch and curve $c$ shows the loss of lysine of a rice which has been treated according to the invention.

The following examples are given merely as illustrative of the present invention and are not to be considered as limiting. Unless otherwise noted, the percentages therein and throughout the application are by weight.

EXAMPLE 1

(I) One kg. of polished rice is soaked in 2 liters of an aqueous solution containing 40% lysine hydrochloride and is maintained for 40 hours at 23° C., the lysine thus permeating therein, and then the water is drained.

(II)(a) After the above-described treatment (I) the polished rice is soaked in an ethanol solution containing 2% benzoylthiamine hydrochloride at 23° C. for 5 minutes and is then removed therefrom. Dibenzoylthiamine-ethanol solution is found to be permeated into an outer layer part of the albumins of the polished rice, and dibenzoylthiamine itself is present in the outer layer part of the albumins. Thereafter, the water is drained.

(b) Instead of the above-mentioned treatment (a), polished rice is soaked in an aqueous solution containing 2% dibenzoylthiamine hydrochloride for 5 minutes at 23° C. so as to make the dibenzoylthiamine permeat into an outer layer part of the albumins of the polished rice, and then, the water is drained.

(c) Instead of the above-described treatments (a) and (b), polished rice is soaked in a luke-warm aqueous solution containing 2% cetyl-$B_1$ for 5 minutes at 60°–70° C. Cetyl-$B_1$ is permeated into an outer part of the albumins of the rice and then, the water is drained.

(d) Instead of (a)–(c), polished rice is soaked in an ethanol solution containing 2% thiamine naphthalene-2,6-disulfonic acid for 5 minutes and then removed. Thiamine naphthalene-2,6-disulfonic acid-ethanol solution is found to be permeated into an outer layer part of the albumins of the polished rice, while thiamine naphthalene-2,6-disulfonic acid itself permeates into an outer layer part of the albumins.

(III) Polished rice, treated as described above, is steamed for 4 minutes so as to gelatinize a surface layer thereof and then dried with hot air at 80° C. or less to remove the water and/or ethanol. A gelatinized layer is formed on a surface layer of the polished rice.

The thus-obtained lysine-enriched rice contains 12–13% moisture and 65 mg. of lysine per gram of polished rice (the usual polished rice contains 2.2 mg. of lysine per gram), and the appearance thereof is excellent. 1.4 kg. of a mixture of the lysine-enriched rice and the usual polished rice (in the ratio of 1:66) is washed for 5 minutes and then boiled. The amounts of lysine lost by washing are 7% (benzoylthiamine organic solvent solution), 8% (dibenzoylthiamine aqueous solution), 6% (cetyl-$B_1$) and 7% (thiamine naphthalene-2,6-disulfonic acid).

EXAMPLE 2

(I) One kg. of polished rice is soaked in 2 liters of a 1% acetic acid solution containing 30% of lysine hydrochloride and 6% of threonine for 40 hours at 23° C., the lysine and threonine permeating into the whole polished rice. Then, the water is drained.

(II)(a) The polished rice from step (I), obtained after draining the water, is sprayed with 500 cc. of an acetone solution containing 2% dibenzoylthiamine at 23° C. and is left as is for 10 minutes so as to make the dibenzoylthiamineacetone solution permeate into an outer layer part of the albumins of the polished rice. Dibenzoylthiamine is also found to be permeated into an outer layer part of the albumins.

(b) Instead of the above-mentioned step (a), polished rice is soaked in a 1% acetic acid solution containing 2% of dibenzoylthiamine for 5 minutes at 23° C. so as to make the dibenzoylthiamine permeate into an outer layer part of the albumin of the polished rice and then, the water is drained.

(c) Instead of using steps (a) and (b), polished rice is soaked in a 1% acetic acid solution containing 2% cetyl-$B_1$ for 5 minutes while maintaining the temperature at 23° C. so as to make the cetyl-$B_1$ permeate into an outer layer part of the albumins of the polished rice. Then, the water is drained.

(d) Instead of (a)–(c), polished rice is sprayed with 500 cc. of an acetone solution containing 2% thiamine naphthalene-2,6-disulfonic acid at 23° C. and left as is for 10 minutes so as to make the thiamine naphthalene-2,6-disulfonic acid-acetone solution permeate into an outer layer part of the albumins of the polished rice. Thiamine naphthalene-2,6-disulfonic acid is also found to be permeated into an outer layer part of the albumins.

Polished rice treated by step (II) is steamed for 4 minutes and the surface layer of the polished rice is gelatinized. Thereafter, the polished rice is dried with hot air at 80° C. or less to remove water, acetic acid and/or acetone. A gelatinized layer is formed on a surface layer of the polished rice.

The thus-obtained rice, enriched with lysine and threonine, contains 12–13% moisture, 32 mg. of lysine and 18 mg. of threonine per gram of polished rice (the usual polished rice contains 2.3 mg. of threonine per gram), and the appearance thereof is excellent. 1.4 kg. of a mixture of the rice enriched with lysine and threonine and the usual polished rice (in the ratio of 1:37) is washed for 3 minutes and boiled. The total amount of lysine and threonine lost is the same as discussed in Example 1, and a delicious boiled rice is obtained.

EXAMPLE 3

(I) One kg. of polished rice is soaked in 2 liters of an aqueous solution containing 40% lysine hydrochloride for 40 hours at 23° C. so as to make the lysine permeate into the whole of the polished rice and then, the water is drained.

(II) The polished rice is soaked in ethanol containing 2% cetyl-$B_1$ at 23° C. for 5 minutes and is then removed therefrom. Cetyl-$B_1$-ethanol solution is found to be permeated into an outer layer part of the albumin of the rice. Cetyl-$B_1$ is also permeated into an outer layer part of the albumins.

(III) The polished rice is steamed for 4 minutes and then, the surface layer of the polished rice is gelatinized. Thereafter, the polished rice is dried with hot air at 80° C. or less to remove the ethanol. A gelatinized layer is formed on the surface layer of the polished rice.

The thus-obtained lysine-enriched rice contains 12–13% moisture and 65 mg. of lysine per gram of polished rice. The appearance thereof is excellent. 1.4 kg. of a mixture of the thus-obtained rice enriched with lysine and the usual polished rice (in the ratio of 1:66) is washed for 3 minutes and then boiled. The amount of lysine lost by washing is 6% and a delicious boiled rice is obtained.

EXAMPLE 4

(I) One kg. of polished rice is soaked in 2 liters of a 1% acetic acid solution containing 30% lysine hydrochloride and 6% threonine for 40 hours at 23° C., with the result that the lysine and threonine permeate into the whole of the polished rice. Then, the water is drained.

(II) The polished rice is sprayed with 500 cc. of an acetone solution containing 2% cetyl-$B_1$ at 23° C. and left as is for 10 minutes. Cetyl-$B_1$-acetone solution is permeated into an outer layer part of the albumins of the polished rice, while cetyl-$B_1$ per se is permeated into an outer layer part of the albumins.

(III) The enriched polished rice is steamed for 4 minutes and the surface layer of the polished rice becomes gelatinized. Thereafter, the polished rice is dried with hot air at 80° C. or less to remove the acetone.

The thus-obtained rice, enriched with lysine and threonine, contains 12–13% moisture, 32 mg. of lysine and 18 mg. of threonine per gram of polished rice. The appearance thereof is excellent. 1.4 kg. of a mixture of the enriched rice and the usual polished rice (in the ratio of 1:37) is washed for 3 minutes and then boiled. The total amount of lysine and threonine lost by washing is 6%. A delicious boiled rice is obtained.

While polished rice has been specifically exemplified in the description hereinabove, it is to be understood that the present invention is applicable to the enrichment of other grains, such as corn, barley, and wheat.

The invention being thus described, it will be obvious that the same may be varied in many ways. Such variations are not to be regarded as a departure from the spirit and scope of the invention, and all such modifications as would be obvious to one skilled in the art are intended to be included herein.

I claim:

1. A process for producing an amino acid-enriched grain resistant to the loss of amino acid which comprises soaking the grain in an aqueous or acidic solution of amino acid for a sufficient time that the amino acid permeates into the grain, removing water from the thus-obtained grain, treating the amino acid-enriched grain with a solution containing sufficient dibenzoylthiamine, cetyl-$B_1$ or thiamine naphthalene-2,6-disulfonic acid for a period of time sufficient to cause said solution to permeate into the outer layer of the albumins of the grain to substantially enhance the resistance of said grain to the loss of amino acid, steaming the grain so as to gelatinize the surface layer thereof, and then drying the resultant grain.

2. The process of claim 1, wherein said grain is rice.

3. The process of claim 1, wherein said amino acid is selected from the group consisting of lysine, threonine and mixtures thereof.

4. The process of claim 1, wherein said solution comprises water, an acid selected from the group consisting of acetic acid, hydrochloric acid, lactic acid and gluconic acid or an organic solvent selected from the group consisting of ethanol and acetone.

5. The process of claim 1, wherein the amino acid-enriched grain is soaked in said dibenzoylthiamine or thiamine naphthalene-2,6-disulfonic acid for about 3–5 minutes.

6. The process of claim 1, wherein the amino acid-enriched grain is soaked in said cetyl-$B_1$ for about 5–10 minutes.

7. The process of claim 1, wherein the amino acid-enriched grain is sprayed with said dibenzoylthiamine, cetyl-$B_1$ or thiamine naphthalene-2,6-disulfonic acid for about 5–10 minutes.

8. The process of claim 1, wherein the grain is soaked in said amino acid solution for about 8 to 40 hours at a temperature of approximately 23°–50° C.

9. The process of claim 8, wherein the concentration of amino acid in said amino acid solution is about 10 to 40% by weight.

10. The process of claim 5, wherein the concentration of dibenzoylthiamine or thiamine naphthalene-2,6-disulfonic acid is about 1–5% by weight.

11. The process of claim 6, wherein the concentration of cetyl-$B_1$ is about 1–5% by weight.

12. The process of claim 11, wherein an aqueous solution of cetyl-$B_1$ having a temperature of about 60°–70° C. is employed in said soaking step.

13. A process for producing an amino acid-enriched rice resistant to the loss of amino acid which comprises soaking the rice in an aqueous or acidic solution of an amino acid selected from the group consisting of lysine, threonine and mixtures thereof for about 8 to 40 hours at a temperature of approximately 23° to 50° C., whereby the amino acid permeates into the rice, removing water from the thus-obtained rice, soaking or spraying the amino acid-enriched rice with a 1–5% weight solution of dibenzoylthiamine, cetyl-$B_1$ or thiamine naphthalene-2,6-disulfonic acid for a period of time sufficient to cause said solution to permeate into the outer layer of the albumins of the grain, steaming the rice for a time sufficient to gelatinize the surface layer thereof, and then drying the resultant treated rice.

14. The process of claim 13, wherein said solution comprises water, an acid selected from the group consisting of acetic acid, hydrochloric acid, lactic acid and gluconic acid or an organic solvent selected from the group consisting of ethanol and acetone.

15. An amino acid-enriched grain produced by the process of claim 1.

References Cited
UNITED STATES PATENTS 3,231,388   1/1966   White _____ 99—92

RAYMOND N. JONES, Primary Examiner